UNITED STATES PATENT OFFICE 2,601,050

DRILLING FLUID

Alfred C. Nestle, Long Beach, Calif., assignor to Texaco Development Corporation, New York, N. Y., a corporation of Delaware No Drawing. Application September 15, 1948, Serial No. 49,455

28 Claims. (Cl. 252—8.5)

This invention relates to drilling fluids and to the preparation and control of such as are employed in the drilling of wells.

Drilling fluids or muds as they are sometimes called are used in the rotary drilling of wells for tapping underground collections of oil, gas, brine or water. Such muds have several functions, the most important of which are to assist in the removal of cuttings from the well, to seal off formations of gas, oil or water which may be encountered at different levels, to lubricate the drilling tool and the drill pipe which carries the tool, and to hold the cuttings in suspension in event of shutdowns in drilling.

The present invention is concerned primarily with aqueous drilling fluids or so-called water-base muds which ordinarily contain water, preferably of potable character, and clay which is selected to produce low water-loss at pumpable viscosities when mixed with water to the desired density. Ground-up hole-detritus obtained in the course of the drilling operation often provides a good source of clay. Wyoming bentonites are often used as supplemental material. The density of the mixes may be varied by the addition of relatively inert or heavier solids such as limestone, hematite or barytes.

The general characteristics of such water-base rotary drilling muds are well known to the art. A number of problems encountered in their use are equally well known to the art.

One such problem is the so-called water-loss problem which becomes increasingly important on the completion of a drilling operation and in the sealing off of low pressure zones. When such zones are encountered, the mud flows into them at first by reason of the pressure differential. Some of the fine solids in suspension in the mud are first filtered out on the zone face and act as a filter to prevent other particles from entering the zone. The particles continue to collect and eventually form a layer termed a mud cake which becomes substantially impervious even to the water phase of the mud. A good mud will form a relatively thin and soft cake which becomes impervious to water in a short time but a bad mud will require much longer and may never form a mud cake sufficiently impervious to prevent loss of the water phase of the mud although the cake may be both thick and tough.

It is an object of this invention to provide a novel method of drilling wherein such water-loss is reduced to a minimum and at a reasonable cost.

A further object of the invention is the provision of a novel drilling mud.

In brief the present invention involves the use in a water-base drilling mud of oil in combination with certain tree bark products, those of Pacific Northwest conifers such as the Douglas Fir being preferred. The addition of other ingredients such as carboxymethylcellulose is contemplated for even better results.

The oil constituent may be either crude or refined oil, so-called seasoned or weathered crude being preferred. Weathered crude is crude oil that has been exposed to the atmosphere as in an open sump.

The bark products include three primary classes of products, i. e., the phellem or cork developed each year by the phellogen or cork cambium which consists of non-elongated thin and thick walled cells converted into cork tissue by development of suberin; a tough fibrous portion of the phloem known as bast or lignified fiber which is recoverable in the form of individual hard fibers; and so-called bark powder which is composed initially of sieve tubes, friable tissues, and other portions of the phloem exclusive of the bast fibers and which readily disintegrates to a fine powder under the action of a ball mill. For convenience, the above three classes of products can be termed the cork fraction, the bark fiber fraction, and the bark powder fraction, respectively. A method of preparing such products is disclosed in Patent No. 2,437,672 to Anway, issued March 16, 1948. These products are sold by the Weyerhaeuser Timber Company under the trade name Silvacon.

In preparing the subject products, thick bark such as that of the old growth Douglas Fir, is cleaned and ground at a moisture content of from 30 to 80%, the grinding being accomplished by any suitable means such as a hammer mill. The resultant product is a mass of bark particles of fairly uniform size.

The next steps involve screening, reduction of moisture content, and further grinding as in a ball mill, the friability of the bark being adjusted to enhance differential pulverization of the several bark constituents and their separation into the several fractions. The steps are fully explained in the above identified patent to which reference may be made for a detailed disclosure.

The following table lists a number of the physical and chemical characteristics of the three principal bark constituents discussed above.

|  | Cork Fraction | Bark Fiber Fraction | Bark Powder Fraction |
|---|---|---|---|
| PHYSICAL PROPERTIES | | | |
| Color | Brownish Yellow | Dark Brown | Reddish Brown. |
| Appearance | Coarse Granular | Fibrous | Powder (fine). |
| Shape | Irregular Size Flakes | Fiber Needles | Amorphous. |
| Particle Size Analysis: | | | |
| Per Cent on 28 mesh | 75 | | |
| Per Cent through 28 on 65 | 25 | 2 | |
| Per Cent through 65 on 100 | | 53 | |
| Per Cent through 100 on 200 | | 44 | 1 |
| Per Cent through 200 on 325 | | 1 | 9 |
| Per Cent through 325 | | | 90 |
| Friability [1] | 45 | 11 | 1.5 |
| Odor-Taste [2] | None | None | None |
| Non-impacted Bulk Density lbs./cu. ft.[3] | 15.5 | 22.0 | 15.5 |
| Impacted Bulk Density lbs. per cu. ft.[4] | 21.0 | 25.5 | 25.0 |
| Densification upon repeated impacting lb./cu. ft. | 5.5 | 3.7 | 7.5 |
| Resistance to Compression, lbs.[5] | 1530 | 490 | 855 |
| Sprung Back Density lbs./cu. ft. | 30 to 20.0 | 30 to 26.0 | 30 to 24.0 |
| Equilibrium Moisture Content at 30% Relative Humidity (Per cent on total basis) | 7.0 | 7.0 | 8.0 |
| Equilibrium Moisture Content at 65% Relative Humidity (Per cent on total basis) | 10.5 | 12.0 | 13.5 |
| Water Holding grams/gram [6] | 1.75 | 1.55 | 2.50 |
| Moldability [7] (ASTM cup bottom thickness in inches) | .102 | .220 | .125 |
| CHEMICAL PROPERTIES | | | |
| Per Cent Cellulose (by difference) | 18 | 64 | 25 |
| Per Cent Lignin (72% $H_2SO_4$) | 60 | 34 | 65 |
| Per Cent Solubility: | | | |
| Ether | 22 | 1.8 | 10 |
| Caustic (2%) | 65 | 28 | 78 |
| pH of Aqueous Suspension | 3.6 | 4.0 | 3.8 |
| Per Cent Ash | 0.9 | 0.8 | 2.0 |
| Per Cent Wax | 9.0 | 3.0 | 5.5 |
| Per Cent Flavanol-type Compound | 9.5 | 1.5 | 6.0 |
| Reactivity with Formaldehyde—Per Cent absorbed[8] | 30.0 | 29.0 | 25.0 |
| Heat Resistance: Per Cent loss of weight [9] | | | |
| 220° F | 0 | 0 | 0 |
| 270° F | 0.2 | 0 | 0.4 |
| 320° F | 0.7 | 0.5 | 1.2 |
| 370° F | 2.9 | 1.5 | 32.6 (ignited) |
| 400° F | 7.9 | 3.0 | |
| 430° F | 38.1 (ignited) | 46.0 (ignited) | |
| Per Cent Carbon | 54.70 | 48.85 | 53.26 |
| Per Cent Hydrogen | 6.40 | 5.92 | 5.71 |
| Per Cent Oxygen | 38.81 | 45.12 | 40.82 |
| Per Cent Nitrogen Kjeldahl Process | .09 | .11 | .21 |

[1] Decrease in coarseness modulus (28, 65, 100, 200, 325 mesh screens) after 30 minutes in ball milling.
[2] Evaluated by "butter test" for 48 hours at 40° F.
[3] 1000 grams under force of own weight in 4-in. diameter can.
[4] Equilibrium value after impacting force of 6.6 ft. lbs.
[5] Pounds force to compress 1 lb. to 30 lbs. per cu. ft. density in 6-in. dia. can.
[6] 4-hour soak and suction filtering.
[7] Cup bottom thickness after ASTM test molding of 25 grams at 300° F.
[8] Product immersed in formaldehyde for one hour.
[9] Incurred after one-half hour heating at various temperatures.

While the aforesaid three products may be used singly or in combinations of two, all three are preferably blended together to form physical mixtures. Typical of such mixture is the product known by the trade name Silvacon 472. This is a blend of the three aforesaid products, the cork fraction being ground slightly finer than indicated in the above table and used in the approximate proportion of 20%, the bark fiber fraction in the approximate proportion of 40%, and the bark powder fraction in the approximate proportion of 40% all by weight. While these proportions are preferred, the proportioning can be varied for each of the constituents within a limit of about 10%. Thus the cork fraction can be varied from 15 to 25% and the other fractions from 35 to 45%.

The preferred blend, having an average particle size of about 10 microns, an apparent specific gravity of about 0.32 and a moisture content, O. D. basis of about 10% can be identified by the following physical and chemical characteristics.

BLEND

*Physical properties*

| | |
|---|---|
| Color | Dark brown |
| Appearance | Powder |
| Shape | Irregulars and fine fiber needles |
| Particle size analysis: | |
| Per cent on 28 mesh | |
| Per cent through 28 on 65 | |
| Per cent through 65 on 100 | 6 |
| Per cent through 100 on 200 | 45 |
| Per cent through 200 on 325 | 24 |
| Per cent through 325 | 25 |
| Friability[1] | 8 |
| Odor-taste[1] | None |
| Non-impacted bulk[1] density lbs./cu. ft. | 23.5 |
| Impacted bulk density lbs. per cu. ft.[1] | 28.0 |
| Densification upon repeated impacting lb./cu. ft. | 4.4 |
| Resistance to compression, lbs.[1] | 775 |
| Sprung back density lbs./cu. ft. | 30 to 25.0 |
| Equilibrium moisture content at 30% relative humidity (per cent on total basis) | 8.0 |
| Equilibrium moisutre content at 65% relative humidity (per cent on total basis) | 12.5 |
| Water holding grams/gram[1] | 2.0 |
| Moldability[1] (ASTM cup bottom thickness in inches) | .112 |

*Physical properties*

| | |
|---|---|
| Per cent cellulose (by difference) | 29 |
| Per cent lignin (72% $H_2SO_4$) | 59 |
| Per cent solubility: | |
| Ether | 12 |
| Caustic (2%) | 69 |
| pH of aqueous suspension | 3.9 |
| Per cent ash | 1.4 |
| Per cent wax | 6.5 |
| Per cent flavanol-type compound | 3.5 |
| Reactivity with formaldehyde—per cent absorbed[1] | 30.0 |
| Heat resistance.—per cent loss of weight[1]: | |
| 220° F. | 0 |
| 270° F. | 0.5 |
| 320° F. | 0.9 |
| 370° F. | 3.4 |
| 400° F. | 46.0 (ignited) |
| 430° F. | |
| Per cent carbon | 52.94 |
| Per cent hydrogen | 6.10 |
| Per cent oxygen | 40.77 |
| Per cent nitrogen kjeldahl process | .19 |

[1] See corresponding notes in previous table.

The oil and bark product combination can be added to drilling mud in a number of different ways. The simplest method is by the addition of the bark product to the mud as it circulates by pumping a portion of the mud through a cone-jet mixer, the bark product being added to the cone at a rate sufficient to obtain a uniform mixture and in the amount necessary. Alternatively, the bark product can be mixed with a small portion of the mud which is subsequently added to the mud system wherein it is agitated during the circulation of the mud.

The oil is added preferably to the mud suction pit from a line which discharges as nearly as possible into the pump suction to insure thorough mixing. The oil can be added to the mud ditch by a cone-jet or charged directly to the mud system through a manifold pump suction. The oil is added preferably in small increments so that it is uniformly distributed throughout the entire mud system. A mixing gun of any well-known type is helpful in mixing in both the bark product and the oil and in obtaining a final smooth mixture.

When properly mixed, the mud will be characterized by an absence of free oil and will have uniform color and appearance.

The amount of the bark product and oil to be added to a particular mud depends upon numerous factors such as the type of the mud, the amount of improvement that is desired in the mud, and the conditions encountered in drilling. No particular figure or range of figures can be set because of the wide variance of the above factors. In the work conducted thus far, 3 to 10 pounds of the bark product have been used per barrel of mud and 20 to 30% by volume (of the mud before treatment) of oil. Proportions in excess of the higher proportions noted do not appear to benefit the mud. On a volume basis and taking the density of the bark product at its non-impacted bulk density of 23.5 lbs. per cu. ft., the minimum ratio of oil to bark product is about 14 to 1.

As illustrative of the improved results obtained by the present invention, tests were conducted with a water base mud, i. e., a Rogers Lake-McKittrick light 1:1 mud in an A. P. I. filter press at 100 pounds per square inch at room temperature. With an addition of 7 pounds of the aforesaid bark product blend per barrel of mud, the water loss was reduced 11.5%. With the addition of 25% by volume crude oil, the water loss was reduced 40.7%. When the same ingredients were added to the mud together and in the amounts above indicated, the water loss was reduced 55%.

In another test where the bark product blend was increased to 14 pounds per barrel of mud, the water loss was reduced 13.9%. When this same quantity of bark product blend was added with crude oil in an amount of 25% by volume, the water loss reduction was 61%.

In another run, the bark product blend in the amount of 7 pounds per barrel of mud was found to reduce the water loss 5%, crude oil alone in an amount of 25% by volume reducing the water loss 50%. When the two agents were used together in the aforesaid proportions, the water loss reduction was 62%.

In another case, 10.5 pounds per barrel of the bark product blend effected a water loss reduction of 2.5%. When crude oil in an amount of 25% by volume was added alone, the water loss reduction was 50%. When the two agents were combined in the aforesaid proportions, the water loss reduction was 61%.

In another tests, 3½ pounds per barrel of the bark product in mud taken from the Santa Paula Well No. 44, Ventura district, California, effected a water loss reduction of 1.5%. Weathered crude of a gravity of 23.7° when added in the amount of 20% by volume effected a water loss reduction of 14.0%. When the two agents were combined in the same proportions, the water loss reduction was 27.2%.

When the bark product in the above example was increased to 7 pounds per barrel, the water loss reduction was 8.5%. When the bark product was introduced with 20% by volume of the same oil, the water loss reduction was increased to 33%.

The percentage water loss reduction was determined by multiplying the untreated-mud water-loss less the treated-mud water-loss by 100 and dividing by the untreated-mud water-loss.

The majority of water-loss reducing materials proposed to date have been characterized by their tendency to increase the viscosities of muds to an undesirable degree. While the oil and bark products when separately employed have been found to increase the viscosity of a mud, it has been found that the combination of the two does not increase the viscosity above that amount caused by the bark product alone and in some cases the combination actually lowers the viscosity below that caused by the bark product alone. In tests conducted at 600 R. P. M. at 77° F. on a Stormer type viscosimeter wherein changes had been made to improve the control of the times and rates of rotation, a Rogers Lake-McKittrick 1:1 mud was found to have a viscosity of 40 centipoises. When the aforesaid bark product blend was added in an amount of 7 pounds per barrel of mud, the viscosity was increased 73%. Crude oil alone in an amount of 25% by volume was found to increase viscosity 44%. When the two agents were added together to the mud in the aforesaid proportions, the viscosity increase was only 70%. In another test when the bark product blend was increased to 10.5 pounds per barrel of mud, the viscosity increase was 106%. When crude oil in an amount of 25% by volume was added, which amount would ordinarily be expected to cause a further increase in viscosity of 44%, there was no further increase in viscosity, the viscosity remaining at 106%.

Even better results have been obtained as regards water-loss reduction when cellulose compounds such as an alkali metal carboxymethylcellulose, available on the market under the trade name of Driscose, is used with the bark products and oil.

Carboxymethylcellulose is preferably employed in the soluble alkali metal forms, the sodium, potassium and lithium salts being satisfactory. A description of such compounds and their manners of use in drilling fluids will be found in Patent No. 2,425,768 to Wagner, issued August 19, 1947.

The carboxymethylcellulose is preferably used in dried powder form in which form it may be added to the drilling fluid flowing in the mud ditch to the pump intake or it can be added in the form of a concentrated solution to the mud.

Tests were made of the combination of oil, bark products and carboxymethylcellulose on a water base mud taken from an operating well, namely the Santa Paula No. 44 well in the South Mountain field, Ventura district of California.

The bark product blend when used in an amount of 3.5 pounds per barrel of mud effected a water loss reduction of 5%. A weathered crude from a South Mountain field was added in an amount of 0.20 barrels of oil to each barrel of mud (16.6% by volume of resultant mud) and carboxymethylcellulose added in amount of 0.25 pounds per barrel of the mud, the two combining to effect a water-loss reduction of 31%. The total water-loss reduction effected by these agents would ordinarily be expected to amount to about 36%. Actually when the three agents were combined in the same mud, the water-loss reduction was 67% or almost twice that expected.

The addition of substances as for viscosity reduction such as polyphosphates or quebracho do not appear to interfere with the bark product and oil combination. The addition of alkali to the mud does not appear necessary. The pH of the mud likewise appears relatively immaterial. Whereas a pH of from 9 to 10.5 is usually recommended for such muds, the bark product-oil combination has been used successfully in muds at a pH in the range of 7.5 to 9.

The drilling fluid of this invention has proven particularly valuable in preparing a completion mud. When a producing formation is struck, especially a zone which is highly permeable, it is usually desired to seal off the oil and drill into the zone a substantial distance before setting the casing and screen. By reason of its ability to form a thin and soft mud cake on the face of such zone, the drilling fluid herein disclosed is of marked advantage since such a mud cake may thereafter be removed easily with a consequent high efficiency in production. If the mud be such that a thick and tough cake is formed, it is difficult to remove the cake thereafter and eliminate its blocking effect with the result that production from the formation is correspondingly reduced. The drilling fluid of the present invention has proven particularly advantageous in this respect in the completion of a number of wells.

The bark products disclosed herein as well as the oil possess the added advantages of being relatively inexpensive, readily available and easily handled.

Obviously many modifications and variations of the invention as above set forth may be made without departing from the spirit and scope thereof, and therefore only such limitations should be imposed as are indicated in the appended claims.

I claim:

1. An aqueous drilling fluid containing not less than about 17% mineral oil by volume and at least one of the finely divided constituents of tree bark selected from the group consisting of the cork fraction, the bark fiber fraction, and the bark powder fraction, said constituent being present in a proportion of not less than about 3 lbs. per bbl. of drilling fluid.

2. The fluid of claim 1 wherein the mineral oil comprises a crude oil.

3. An aqueous drilling fluid containing not less than about 17% mineral oil by volume and a combination of finely divided constituents of tree bark including the cork fraction, the bark fiber fraction and the bark powder fraction, said constituents being present in a proportion of not less than about 3 lbs. per bbl. of drilling fluid.

4. The fluid of claim 3 wherein the bark is Douglas fir tree bark.

5. The fluid of claim 3 wherein the cork fraction is present in an amount of about 15 to 20%, the bark fiber fraction in an amount of about 35 to 45% and the bark powder fraction in an amount of about 35 to 45%, all by weight.

6. The fluid of claim 3 wherein the cork fraction is present in an amount of about 20%, the bark fiber fraction in an amount of about 40%, and the bark powder fraction in an amount of about 40%, all by weight.

7. The fluid of claim 3 wherein said constituent combination has a particle size distribution of about 50% by weight through 100 on 200 mesh, and about 25% by weight through 325 mesh.

8. The fluid of claim 3 wherein said constituent combination has a particle size distribution of about 50% by weight through 100 on 200 mesh, about 25% by weight through 200 on 325 mesh, and about 25% by weight through 325 mesh.

9. An aqueous drilling fluid containing crude oil in a proportion of not less than about 17% by volume and a combination of finely divided constituents of tree bark including the cork fraction, the bark fiber fraction, and the bark powder fraction, said constituents being present in a proportion of not less than about 3 lbs. per bbl. of drilling fluid.

10. An aqueous drilling fluid containing mineral oil in a proportion of not less than about 17% by volume, at least one of the finely divided constituents of tree bark selected from the group consisting of the cork fraction, the bark fiber fraction and the bark powder fraction in a proportion of not less than about 3 lbs. per bbl. of drilling fluid and a water-soluble alkali metal carboxymethylcellulose in a proportion sufficient to minimize water-loss from said fluid.

11. The fluid of claim 10 wherein said mineral oil comprises a crude oil.

12. In the process for drilling a well with well drilling tools wherein there is circulated in the well a water base drilling mud containing particles of clayey material suspended in sufficient water to render the same circulatable, the method of forming a filter cake on the wall of said well to decrease the loss of fluid from said drilling mud contained therein into surrounding earthen formations which comprises admixing said drilling mud with mineral oil in a proportion of not less than about 17% by volume and with at least one relatively finely divided constituent of tree bark selected from the group consisting of the cork fraction, the bark fiber fraction and the bark powder fraction in a proportion of not less than about 3 lbs. per bbl. of drilling fluid, contacting the wall of said well with the resulting drilling fluid to form said filter cake thereon, and subsequently mixing said mud with additional tree bark constituent to maintain the aforesaid minimum proportions.

13. In the process for drilling a well with well drilling tools wherein there is circulated in the well a water base drilling mud containing particles of clayey material suspended in sufficient water to render the same circulatable, the method of forming a filter cake on the wall of said well to decrease the loss of fluid from said drilling mud contained therein into the surrounding earthen formations which comprises admixing said drilling mud with mineral oil in a proportion of not less than about 17% by volume and with at least one relatively finely divided constituent of the tree bark selected from the group consisting of the cork fraction, the bark fiber fraction and the bark powder fraction in a proportion of not less than about 3 lbs. per bbl. of drilling fluid, and contacting the wall of said well with the resulting drilling fluid to form said filter cake thereon.

14. The process of claim 13 wherein the bark is Douglas fir tree bark.

15. The process of claim 13 wherein the cork fraction is used in an amount of about 15 to 25%, the bark fiber fraction in an amount of about 35 to 45%, and the bark powder fraction in an amount of about 35 to 45%, all by weight.

16. The process of claim 13 wherein the cork fraction is used in an amount of about 20%, the bark fiber fraction in an amount of about 40%, and the bark powder fraction in an amount of about 40%, all by weight.

17. The process of claim 13 wherein said constituent combination has a particle size distribution of about 50% by weight through 100 on 200 mesh, and about 25% by weight through 325 mesh.

18. The process of claim 13 wherein said constituent combination has a particle size distribution of about 50% by weight through 100 on 200 mesh, about 25% by weight through 200 on 325 mesh, and about 25% by weight through 325 mesh.

19. The process of claim 12 wherein said mineral oil comprises crude oil.

20. The process of claim 13 wherein said mineral oil comprises crude oil.

21. The process of claim 13 wherein said mud contains a water-soluble alkali metal carboxymethylcellulose in a proportion to minimize water loss.

22. The process of claim 13 wherein the mineral oil comprises crude oil and wherein the mud includes a water-soluble alkali metal carboxymethylcellulose in a proportion of about 0.25 lb. per bbl. of drilling fluid.

23. An aqueous drilling fluid containing mineral oil and a relatively finely divided tree bark constituent of the group consisting of the cork fraction, the bark fiber fraction and the bark powder fraction in a minimum volumetric ratio of approximately 14 to 1 based on the non-impacted bulk density of said tree bark constituent, the oil and tree bark constituent being present in an amount sufficient to materially reduce water-loss from the drilling fluid.

24. An aqueous drilling fluid containing mineral oil and at least one of the finely divided constituents of tree bark selected from the group consisting of the cork fraction, the bark fiber fraction, and the bark powder fraction, the oil and tree bark constituent being present in a minimum volumetric ratio of approximately 14 to 1 based on the non-impacted bulk density of the tree bark constituent, the oil and tree bark constituent being present in an amount sufficient to materially reduce water-loss from the drilling fluid.

25. An aqueous drilling fluid containing mineral oil and a combination of finely divided constituents of tree bark including the cork fraction, the bark fiber fraction and the bark powder fraction, the oil and tree bark constituents being present in a minimum volumetric ratio of approximately 14 to 1 based on the non-impacted bulk density of the tree bark constituent, the latter and the oil being present in an amount sufficient to materially reduce water-loss from the drilling fluid.

26. The fluid of claim 25 wherein the bark is Douglas fir tree bark.

27. The process of claim 13 wherein the relatively finely divided tree bark constituent material is present in a minimum proportion of oil to bark material of about 14–1 by volume, based on the non-impacted bulk density of the bark material.

28. In the process for drilling a well with well drilling tools wherein there is circulated in the well a water base drilling mud containing particles of clayey material suspended in sufficient water to render the same circulatable, the method of forming a filter cake on the wall of said well to decrease the loss of fluid from said drilling mud contained therein into surrounding earthen formations, which comprises admixing said drilling mud with mineral oil and with at least one relatively finely divided constituent of tree bark selected from the group consisting of the cork fraction, the bark fiber fraction and the bark powder fraction in a minimum proportion of oil to bark material of about 14–1, by volume, based on the non-impacted bulk density of said tree bark material, and contacting the wall of said well with the resulting drilling fluid to form said filter cake thereon.

ALFRED C. NESTLE.

REFERENCES CITED

The following references are of record in the file of this patent:

UNITED STATES PATENTS

| Number | Name | Date |
|---|---|---|
| 1,455,762 | Howard | May 15, 1923 |
| 2,209,591 | Barnes | July 30, 1940 |
| 2,425,768 | Wagner | Aug. 19, 1947 |
| 2,437,672 | Anway | Mar. 16, 1948 |
| 2,444,929 | Hatch | July 13, 1948 |
| 2,446,551 | Pauley | Aug. 10, 1948 |
| 2,468,657 | Dyke et al. | Apr. 26, 1949 |
| 2,468,658 | Dyke et al. | Apr. 26, 1949 |
| 2,498,301 | Self | Feb. 21, 1950 |

OTHER REFERENCES

Langton: Fibrous Materials Aid Restoring Lost Drilling Well Circulation, Article in the Oil and Gas Journal, April 23, 1936, pgs. 31, 33 and 34.

Stern: Role of Clay and Other Minerals in Oil-Well Drilling Fluids, Bureau of Mines Report of Investigations, pgs. 67 and 68.